(12) United States Patent
Weaver

(10) Patent No.: US 11,451,957 B2
(45) Date of Patent: Sep. 20, 2022

(54) TRAFFIC MANAGEMENT OF PROPRIETARY DATA IN A NETWORK

(71) Applicant: PHILLIPS CONNECT TECHNOLOGIES LLC, Santa Fe Springs, CA (US)

(72) Inventor: Edward Hiroyuki Weaver, Orange, CA (US)

(73) Assignee: Phillips Connect Technologies LLC, Santa Fe Springs, CA (US)

( * ) Notice: Subject to any disclaimer, the term of this patent is extended or adjusted under 35 U.S.C. 154(b) by 684 days.

(21) Appl. No.: 16/287,623

(22) Filed: Feb. 27, 2019

(65) Prior Publication Data

US 2019/0223007 A1 Jul. 18, 2019

Related U.S. Application Data

(63) Continuation-in-part of application No. 15/728,498, filed on Oct. 9, 2017, now Pat. No. 10,858,053.
(Continued)

(51) Int. Cl.
*H04W 12/03* (2021.01)
*H04L 67/12* (2022.01)
(Continued)

(52) U.S. Cl.
CPC ......... *H04W 12/03* (2021.01); *H04L 12/1886* (2013.01); *H04L 12/40* (2013.01);
(Continued)

(58) Field of Classification Search
CPC ... H04W 12/03; H04W 12/088; H04W 12/00; H04W 4/38; H04W 4/44; H04L 12/1886;
(Continued)

(56) References Cited

U.S. PATENT DOCUMENTS 6,121,875 A  9/2000 Hamm
6,737,962 B2 5/2004 Mayor
(Continued)

FOREIGN PATENT DOCUMENTS

CN   1906643 A   1/2007
CN 103702844 A   4/2014
(Continued)

OTHER PUBLICATIONS

International Search Report and Written Opinion for International Application No. PCT/US2019/019870, dated May 28, 2019, 18 pages.
(Continued)

*Primary Examiner* — John A Tweel, Jr.
(74) *Attorney, Agent, or Firm* — Haynes and Boone, LLP

(57) ABSTRACT

A method for traffic management of proprietary data, in a network system comprising a gateway and a sensor communicatively coupled to the gateway via a data bus, includes determining, by a processor of a bridging device, whether a dedicated pipeline for transmission to the gateway is available, in response to determining that the dedicated pipeline is available, transmitting, by the processor, a request for the dedicated pipeline, determining, by the processor, whether the dedicated pipeline has been established between the bridging device and the gateway, and in response to determining that the dedicated pipe has been established, requesting, by the processor, the proprietary data from the sensor, transmitting, by the processor, the proprietary data from the sensor to the gateway via the dedicated pipeline, and transmitting, by the processor, a dedicated pipeline release signal to the gateway indicating release of dedicated pipeline between the bridging device and the gateway.

20 Claims, 9 Drawing Sheets

Related U.S. Application Data

(60) Provisional application No. 62/635,970, filed on Feb. 27, 2018.

(51) Int. Cl.
| | |
|---|---|
| *H04L 67/125* | (2022.01) |
| *H04W 28/02* | (2009.01) |
| *H04L 61/2539* | (2022.01) |
| *H04L 47/62* | (2022.01) |
| *H04L 9/40* | (2022.01) |
| *H04L 12/18* | (2006.01) |
| *H04L 41/00* | (2022.01) |
| *H04L 12/40* | (2006.01) |
| *H04W 12/088* | (2021.01) |
| *H04W 12/00* | (2021.01) |
| *H04L 67/00* | (2022.01) |
| *H04L 47/50* | (2022.01) |
| *H04L 101/695* | (2022.01) |
| *H04W 4/38* | (2018.01) |
| *H04W 4/44* | (2018.01) |

(52) U.S. Cl.
CPC .............. *H04L 41/00* (2013.01); *H04L 47/50* (2013.01); *H04L 47/62* (2013.01); *H04L 61/2539* (2013.01); *H04L 63/0414* (2013.01); *H04L 63/0428* (2013.01); *H04L 67/00* (2013.01); *H04L 67/12* (2013.01); *H04L 67/125* (2013.01); *H04W 12/00* (2013.01); *H04W 12/088* (2021.01); *H04W 28/021* (2013.01); *H04L 61/6095* (2013.01); *H04L 63/0272* (2013.01); *H04W 4/38* (2018.02); *H04W 4/44* (2018.02)

(58) Field of Classification Search
CPC ......... H04L 12/40; H04L 41/00; H04L 47/50; H04L 61/2539; H04L 63/0414; H04L 63/0428; H04L 67/00; H04L 67/12; H04L 67/125; H04L 61/6095; H04L 63/0272; H04L 47/62; H04L 63/105
See application file for complete search history.

(56) References Cited

U.S. PATENT DOCUMENTS

| | | |
|---|---|---|
| 7,417,543 B2 | 8/2008 | Breed |
| 7,965,195 B2 | 6/2011 | Deaver, Sr |
| 8,280,656 B2 | 10/2012 | Kreiss |
| 8,566,046 B2 | 10/2013 | Deaver, Sr. |
| 9,030,321 B2 | 5/2015 | Bergman |
| 10,057,382 B2 * | 8/2018 | Sathyadevan .......... G06N 20/00 |
| 10,065,563 B2 | 9/2018 | Cornelius |
| 10,093,232 B2 | 10/2018 | Troutman |
| 11,073,826 B2 * | 7/2021 | Cella .................. G05B 23/0289 |
| 2002/0027502 A1 | 3/2002 | Mayor |
| 2005/0235169 A1 | 10/2005 | Lou |
| 2007/0038346 A1 | 2/2007 | Ehrlich et al. |
| 2014/0081544 A1 | 3/2014 | Fry |
| 2014/0152422 A1 | 6/2014 | Breed |
| 2016/0014544 A1 * | 1/2016 | Boudreau ............... H04L 67/12 |
| | | 370/294 |
| 2016/0135109 A1 | 5/2016 | Hampel et al. |

FOREIGN PATENT DOCUMENTS

| | | |
|---|---|---|
| EP | 3 011 766 A1 | 4/2016 |
| WO | WO 01/51326 | 7/2001 |
| WO | WO 2014/203205 A1 | 12/2014 |

OTHER PUBLICATIONS

European Office Action dated Mar. 9, 2021, European Application No. 17800962.7, 5 pages.

* cited by examiner

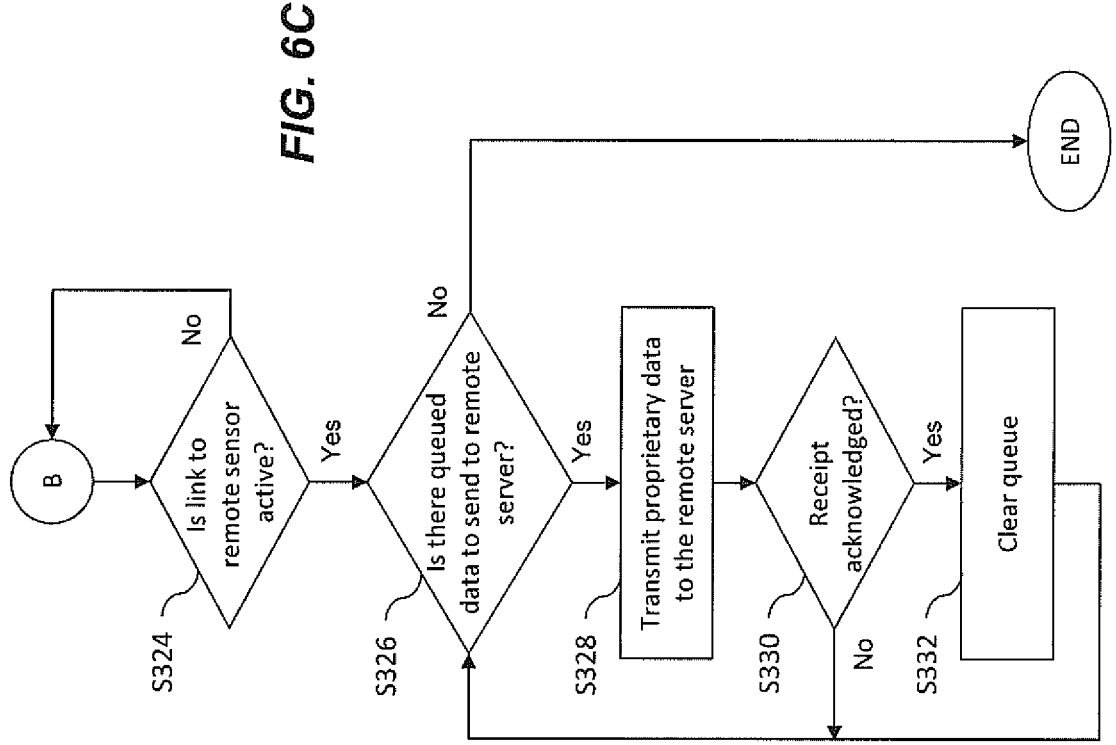

TRAFFIC MANAGEMENT OF PROPRIETARY DATA IN A NETWORK

CROSS-REFERENCE TO RELATED APPLICATION(S)

This application is a continuation in part of U.S. application Ser. No. 15/728,498 ("SMART TRAILER SYSTEM"), filed on Oct. 9, 2017, the entire content of which is incorporated herein by reference.

This application also claims priority to, and the benefit of, U.S. Provisional Application No. 62/635,970 ("TRAFFIC MANAGEMENT OF PROPRIETARY DATA FROM A VEHICLE NETWORK THROUGH A TELEMATICS SYSTEM"), filed on Feb. 27, 2018, the entire content of which is incorporated herein by reference.

FIELD

The present invention relates to the field of data transmission in a network.

BACKGROUND

Recently, vehicle network topologies have been introduced to improve the operation of the vehicle. Such networks may include sensors, which work in tangent to collect information about various aspects of the vehicle's operation, and one or more gateway nodes that transmit the collected data to a remote server for analysis. These networks are often open networks, meaning that all nodes on the network are able to observe all data transmitted by every other node. However, this may become problematic in a vehicle network made up of sensors from competing manufacturers.

In addition to vehicle operation data, each sensor may also collect and broadcast sensitive proprietary data on the internal operations of the sensor itself. When such information is captured by a sensor from a competing manufacturer, the information may be used by the competing manufacturer to gain insight into the operations of the sensor and potentially allow the competitor to reverse engineer the sensor.

What is a desired, then, is a safe and secure method for network nodes to communicate sensitive proprietary information to a remote server without the possibility of the data being exposed to other network nodes.

The above information disclosed in this Background section is only for enhancement of understanding of the background of the invention and therefore it may contain information that does not form the prior art that is already known to a person of ordinary skill in the art.

SUMMARY

Aspects of embodiments of the present invention are directed to a sensor network having sensors connected through a system bus, whereby every sensor on the system bus is segregated from all other sensors by a bridging device, which may selectively allow or block data traffic to pass to the sensor based on the sensitivity of the data being transmitted on the system bus. In some embodiments, the sensor network is utilized in a smart trailer system of a commercial vehicle capable of communicating sensor data to a remote server.

According to some embodiments of the invention, there is provided a method for traffic management of proprietary data in a network system comprising a gateway and a sensor communicatively coupled to the gateway via a data bus, the method including: determining, by a processor of a bridging device, whether a dedicated pipeline for transmission to the gateway is available; in response to determining that the dedicated pipeline is available: transmitting, by the processor, a request for the dedicated pipeline; determining, by the processor, whether the dedicated pipeline has been established between the bridging device and the gateway; and in response to determining that the dedicated pipe has been established with the bridging device: requesting and queueing, by the processor, the proprietary data from the sensor; transmitting, by the processor, the proprietary data from the sensor to the gateway via the dedicated pipeline; and transmitting, by the processor, a dedicated pipeline release signal to the gateway indicating release of dedicated pipeline between the bridging device and the gateway.

In some embodiments, the method further includes: receiving, by the processor, a request from the sensor to send proprietary data, prior to determining whether the dedicated pipeline is available.

In some embodiments, the method further includes: in response to determining that the dedicated pipeline is not established with the bridging device: screening, by the processor, all communication on the data bus from the sensor.

In some embodiments, screening all communication on the data bus includes: masking, by the processor, addresses of incoming data traffic prior to forwarding the data traffic to the sensor, or sending, by the processor, a signal of all zeroes to the sensor instead of the incoming data traffic.

In some embodiments, the method further includes: in response to determining that the dedicated pipeline is not established with the bridging device: determining, by the processor, whether the dedicated pipeline has been released; discontinuing, by the processor, the screening of all communication on the data bus from the sensor; and resuming, by the processor, normal transmission of non-proprietary data to the gateway.

In some embodiments, determining that the dedicated pipeline is available includes: receiving, by the processor, a dedicated pipeline open signal from the gateway via the data bus.

In some embodiments, the transmitting of the proprietary data includes: requesting, by the processor, the proprietary data from the sensor; receiving, by the processor, the proprietary data from the sensor; queueing, by the processor, the proprietary data in a queue; transmitting, by the processor, the queued proprietary data to the gateway via the dedicated pipeline; and receiving, by the processor, a proprietary data received signal from the gateway indicating receipt of transmitted data.

In some embodiments, the transmitting of the proprietary data further includes: clearing, by the processor, the queue of the queued proprietary data; and requesting, by the processor, more proprietary data from the sensor.

In some embodiments, the transmitting of the dedicated pipeline release signal is in response to one or more of: determining, by the processor, that all proprietary data at the sensor has been successfully sent to the gateway; determining, by the processor, that data has not been received from the sensor within a first period of time, in response to requesting the proprietary data; and determining, by the processor, that a proprietary data received signal has not been received from the gateway within a second period of time, in response to transmitting the proprietary data.

In some embodiments, the proprietary data includes diagnostic and/or troubleshooting data corresponding to an internal operational of the sensor.

According to some embodiments of the invention, there is provided a method for traffic management of proprietary data in a network system including a gateway and a sensor node communicatively coupled to the gateway via a data bus, the method including: determining, by a processor of the gateway, whether there is an active connection to a remote server; and in response to determining that there is the active connection to the remote server: broadcasting, by the processor, availability of a dedicated pipeline for transmission of proprietary data to the gateway via the data bus; determining, by the processor, whether a request for the dedicated pipeline is received from the sensor node; and in response to determining that the request for the dedicated pipeline is received from the sensor node within a set period of time: broadcasting, by the processor, on the data bus, by the processor, a dedicated pipeline reserved signal indicating establishment of the dedicated pipeline between the gateway and the sensor node; determining, by the processor, whether the proprietary data has been received from the sensor node; and in response to determining that the proprietary data has been received: transmitting, by the processor, a proprietary data received signal to the sensor node indicating confirmation of data receipt.

In some embodiments, the method further includes: in response to determining that the request for the dedicated pipeline is not received from the sensor node within the set period of time: broadcasting, by the processor, unavailability of the dedicated pipeline to the sensor node via the data bus.

In some embodiments, the method further includes: in response to determining that the proprietary data has been received: queueing, by the processor, the proprietary data in a queue; and determining, by the processor, whether further proprietary data has been received from the sensor node.

In some embodiments, the method further includes: in response to determining that the proprietary data signal has not been received: determining, by the processor, whether a dedicated pipeline has been released by the sensor node; and in response to determining that the dedicated pipeline has been released by the sensor node: broadcasting, by the processor, a dedicated pipeline closed signal to the sensor node via the data bus, the dedicated pipeline closed signal indicating to the sensor node that the dedicated pipeline is no longer available.

In some embodiments, the method further includes: in response to determining that the proprietary data signal has not been received: determining, by the processor, whether a communication timer has expired; in response to determining that the communication timer has expired: broadcasting, by the processor, a dedicated pipeline closed signal to the sensor node via the data bus, the dedicated pipeline closed signal indicating to the sensor node that the dedicated pipeline is no longer available; and in response to determining that the communication timer has not expired: determining again, by the processor, whether the proprietary data has been received from the sensor node.

In some embodiments, the method further includes: prior to determining whether there is an active connection to the remote server, broadcasting, by the processor, a dedicated pipeline closed signal to the sensor node via the data bus, the dedicated pipeline closed signal indicating resumption of normal data transfer operations.

In some embodiments, in response to determining that there is no active connection to the remote server: broadcasting, by the processor, a dedicated pipeline closed signal to the sensor node via the data bus.

In some embodiments, the method further includes: transmitting, by the processor, the proprietary data to the remote server.

In some embodiments, the transmitting of the proprietary data includes: determining, by the processor, whether there is an existing queue of proprietary data to transmit to the remote server; and in response to determining that there is an existing queue of proprietary data: transmitting, by the processor, the queue of proprietary data to the remote server.

In some embodiments, the method further includes, in response to determining that there is an existing queue of proprietary data: receiving, by the processor, an acknowledgment of transmission from the remote server; and clearing, by the processor, the existing queued data.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be illustrative only.

FIGS. 6A-6C illustrate a process of sending proprietary data from a sensor of the network system to a remote server via a dedicated pipeline, as performed by a gateway of the network system, according to some exemplary embodiments of the present invention.

DETAILED DESCRIPTION

The detailed description set forth below in connection with the appended drawings is intended as a description of illustrative embodiments of a smart trailer in accordance with the present invention, and is not intended to represent the only forms in which the present invention may be implemented or utilized. The description sets forth the features of the present invention in connection with the illustrated embodiments. It is to be understood, however, that the same or equivalent functions and structures may be accomplished by different embodiments that are also intended to be encompassed within the spirit and scope of the present invention. As denoted elsewhere herein, like element numbers are intended to indicate like elements or features.

Aspects of embodiments of the present invention are directed to an open telematics solution that provides universal connectivity to multiple commercial components and which is capable of enabling secure transfer of sensitive proprietary information from a component to a remote server while preventing other components from eavesdropping on the transfer of proprietary data.

According to some embodiments, a smart trailer system includes a sensor network with multiple sensors and a gateway that transmits data to and from a remote server. During normal operation, all sensors may work in tangent within the system and may be able to see the data transmitted from the other sensors. Periodically, the smart trailer system may have to upload sensitive proprietary information collected by each sensor onto a remote server. To prevent other sensors, which may be from competing manufacturers, from eavesdropping on the sensitive proprietary information, some embodiments of the present invention utilize bridge devices to segregate the other sensors from the system bus when sensitive proprietary information is being transmitted on the system bus. Thus, embodiments of the present invention provide an automated and secure system whereby sensitive proprietary information may be obtained (over the air) from a sensor without having an operator physically go to the location of the sensor and manually downloading such information.

Figure 1:
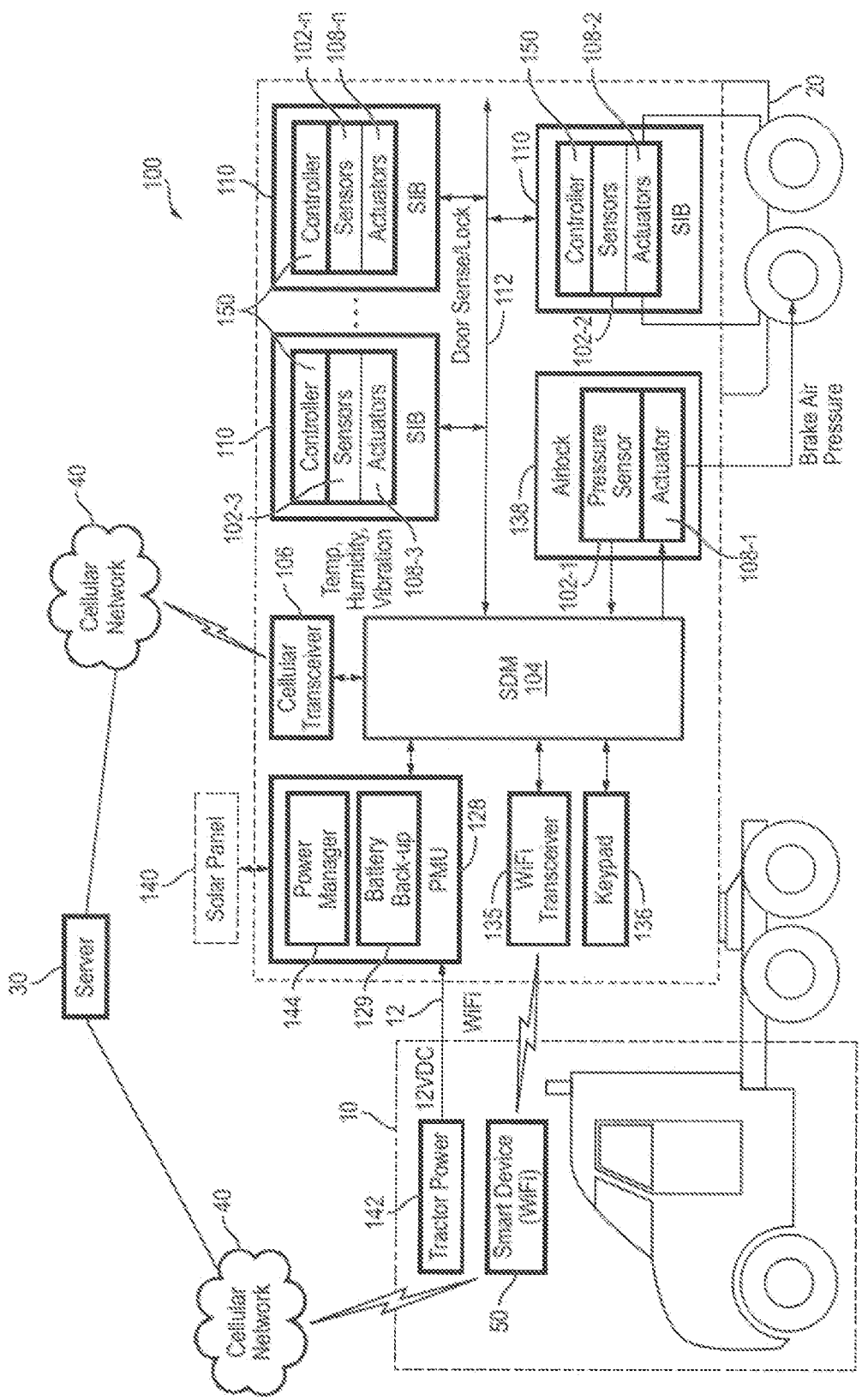
FIG. 1 is a block diagram of a commercial vehicle including the smart trailer system, according to some exemplary embodiments of the invention.

FIG. 1 is a block diagram of a commercial vehicle including the smart trailer system 100, according to some exemplary embodiments of the invention.

Referring to FIG. 1, the commercial vehicle includes a tractor 10 and a trailer 20, which houses the smart trailer system (STS) 100. The STS 100 includes a sensor network 101 (shown in FIG. 2), which may include a plurality of sensors 102-1, 102-2, . . . , 102-n, and a master controller (e.g., a gateway or a sensor distribution module (SDM)) 104 for managing the sensor network 101. In some embodiments, the sensor network 101 is installed in the trailer 20; however, embodiments of the present invention are not limited thereto, and in some examples, some of the sensors in the sensor network 101 may be installed in the tractor 10. The STS 100 further includes a wireless communication module (e.g., a cellular modem/transceiver 106 and/or a wireless transceiver 135) for transmitting the sensor network data to a fleet monitoring server (also referred to as a fleet managing server) 30 that manages the associated trailer fleet, over a communications network (e.g., a cellular network) 40, for further processing and analysis. The server 30 may manage the data generated by the sensor network 101. One or more user devices 50 may be utilized to view and analyze the sensor network data. The STS 100 may provide trailer security, diagnostics, environmental monitoring, cargo analysis, predictive maintenance monitoring, telemetry data, and/or the like.

Figure 2:
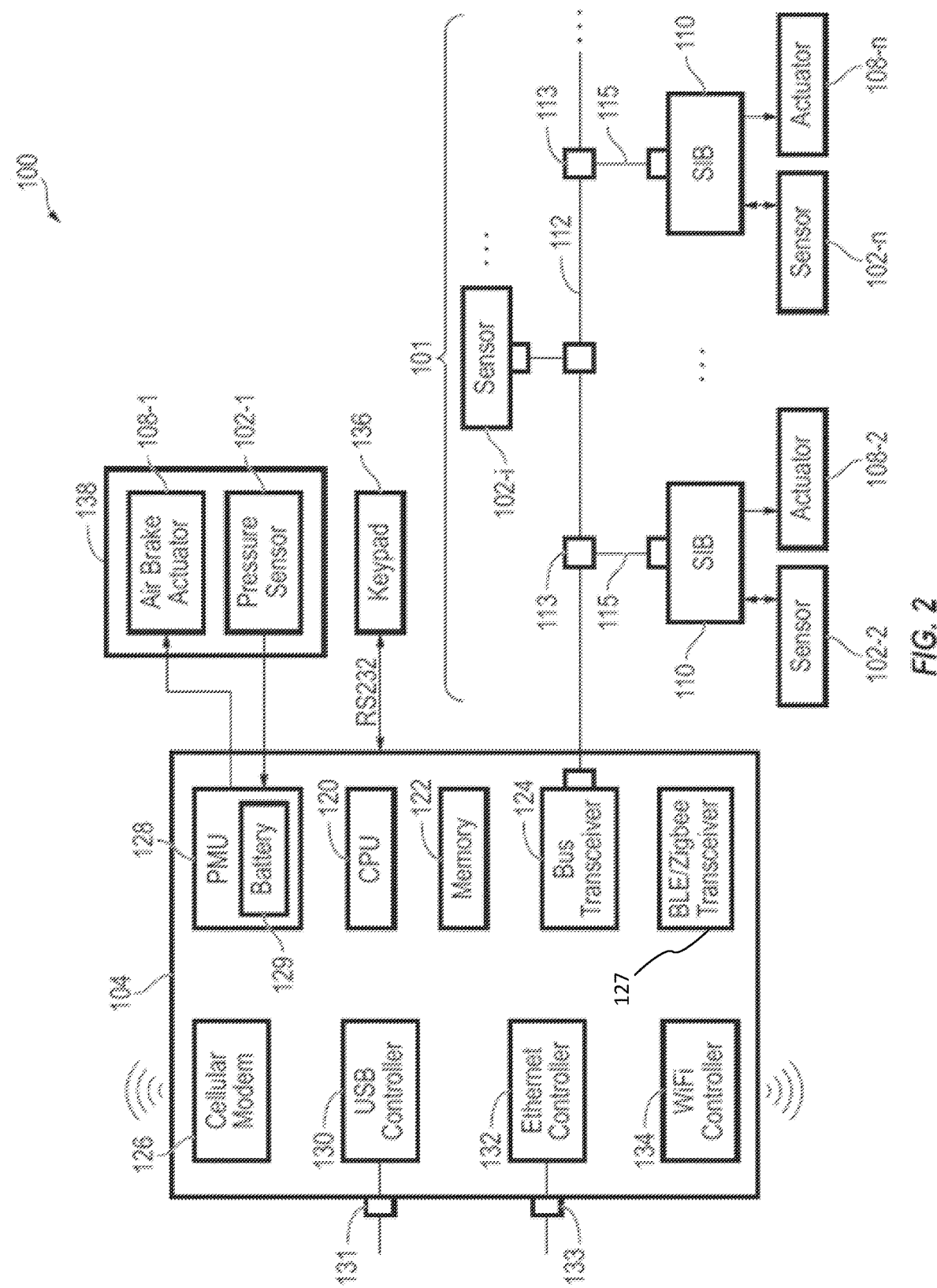
FIG. 2 is a block diagram of a trailer sensor network in communication with the master controller, according to some exemplary embodiments of the present invention.

FIG. 2 is a block diagram of a trailer sensor network 101 in communication with the master controller 104, according to some exemplary embodiments of the present invention.

According to some embodiments, the master controller 104 serves as the gateway that manages the network 101 and all communications to and from the fleet monitoring server 30. In some embodiments, a plurality of sensor interface boards (SIBs) 110 are communicatively coupled to the master controller 104 via a data bus (e.g., a serial controller area (CAN) bus) 112. Each SIB 110 monitors and controls one or more local sensors and actuators installed at various locations within the trailer 20. The sensors 102 of the STS 100 may be coupled to the master controller 104 via a SIB 110 on the data bus 112 (e.g., as is the case with the sensors 102-1 to 102-n of FIG. 2) or directly via a bus interface adapter (e.g., a CAN bus interface adapter, as is the case with sensor 102-i of FIG. 2).

While, in FIG. 2, every SIB 110 is illustrated as being connected to a sensor 102 and an actuator 108 (e.g., 108-1, 108-2 . . . 108-n), embodiments of the present invention are not limited thereto. For example, each SIB 110 may be coupled to one or more sensors 102 and/or one or more actuators 108.

According to some embodiments, the master controller 104 includes an onboard microcontroller (e.g., a central processing unit (CPU)) 120, which manages all functions of the master controller 104 including self-tests and diagnostics; a memory device (e.g., a volatile and/or non-volatile memory) 122 for storing the data collected from the sensors 102 as well as firmware, operational and configuration data of the master controller 104; a bus transceiver 124 for interfacing with the SIBs 110 and any directly connected sensors 102 via the data bus 112; and a power management unit (PMU) 128 for generating all operating voltages required by the STS 100. While the embodiments of FIG. 2 illustrate the PMU 128 as being part of the master controller 104, embodiments of the invention are not limited thereto. For example, the PMU 128 may be external to the master controller 104 (e.g., as shown in FIG. 1).

In some embodiments, the master controller 104 ensures that the data in the memory 122 is preserved under conditions including loss of power, system reset, and/or the like. In some examples, the memory 122 may have sufficient capacity to store a minimum of two weeks of data locally. Upon receiving a data request from the fleet managing server 30, the microcontroller 120 may retrieve the requested data from the memory 122 and send it to the server 30 via the cellular modem 126 and/or the WiFi transceiver 135. The microcontroller 120 may also delete data from the memory 122 upon receiving a delete data request from the server 30.

The PMU 128 may receive a DC voltage (e.g., a fixed DC voltage) from the tractor 10 (e.g., the tractor power 142 as shown in FIG. 1) via an electrical cable (e.g., a 7-way or 15-way tractor connector), and may utilize it to generate the regulated voltage(s) (e.g., the regulated DC voltage(s)) used by the master controller 104 and the other components in the STS 100. The PMU 128 may include protection circuits for preventing damage to the STS 100 in the event of power surges (e.g., a load dump), overcurrent, overvoltage, reverse battery connection, and/or the like.

In some embodiments, the PMU 128 includes a backup battery 129 for providing power to the STS 100 in the absence of tractor power. For example, when the vehicle is idle (e.g., when the tractor is off), no power may be provided by the tractor 10, and the STS 100 may rely on the backup battery 129 as a source of power. In some examples, the backup battery 129 may have sufficient capacity to power operations of the STS 100 for a minimum of 48 hours without an external power source (e.g., without the tractor power 142) and/or solar panel 140.

In some examples, the PMU 128 may also receive electrical power from auxiliary power sources 140, such as solar panels that may be installed on the trailer 20, an onboard generator, an onboard refrigerator (e.g., refrigerator battery), and/or the like. In the presence of multiple sources of power (e.g., two or more of the backup power 129, auxiliary sources 140, and tractor power 142), the PMU 128 monitors each source and selects which power source to utilize to power the master controller 104 and the STS 100 as a whole. The power management circuit of the PMU 128 may charge the backup battery 129 when the input voltage from the tractor power 142 or the auxiliary sources 140 is above a threshold (e.g., a minimum level), and may disable charging of the backup battery 129 when the input voltage is below the threshold. The auxiliary power sources 140 may extend the operating time of the STS 100 when the tractor 10 is off (e.g., parked and not operational).

According to some embodiments, the PMU 128 provides status information including solar panel voltage, the output voltage (e.g., the 24 VDC output voltage including overvoltage, overcurrent, etc.), battery charge level, battery charge status, battery charge source, battery current draw, present source of system power, and/or the like to the master controller 104. The PMU 128 may generate an alert when any of the above power parameters are outside of normal operating ranges.

In some examples, when tractor power 142 is available (e.g., at the 7-way tractor connector) and the trailer is traveling at a predefined speed (e.g., about 50 MPH), the PMU 128 may perform a discharge test on the backup battery 129, which allows the STS 100 to compare the discharge profile of the backup battery 129 to that of a new battery, and determine an estimate of the remaining battery life.

In some embodiments, the PMU 128 acts as the interface between the microcontroller 120 and the air brake lock system 138 (i.e., the trailer's emergency air brake system). In addition to normal functionality of the air brake lock system 138, the STS 100 is also capable of engaging the air brake lock system 138 for security purposes, such as when an unauthorized tractor connects to the trailer 20 and attempts to move it. Because the air brake lock system 138 is a safety related feature, the STS 100 has safeguards in place to ensure that the emergency brake does not engage while the trailer 20 is in motion. For example, the master controller 104 prevents the air brake lock system 138 from engaging the emergency brake when the trailer 20 is in motion. This may be accomplished with speed data from the cellular modem 126 and/or data from accelerometers in the STS 100. The air brake lock system 138 includes a pressure sensor 102-1, which monitors the brake system air pressure, and an air brake actuator 108-1 for engaging and disengaging the air line to the emergency brake system.

In some embodiments, the master controller 104 includes a cellular modem 126 for providing a wireless communication link between the STS 100 (e.g., the master controller 104) and the fleet monitoring server 30. The cellular modem 126 may be compatible with cellular networks such as 4G and/or LTE networks. The cellular modem 126 may facilitate over-the-air updates of the master controller 104. While the embodiments of FIG. 2 illustrate the cellular modem 126 as being part of the master controller 104, embodiments of the invention are not limited thereto. For example, the cellular modem 126 may be external to the master controller 104 (as, e.g., shown in the FIG. 1).

In some examples, the master controller 104 may also include one or more of a USB controller 130, an Ethernet controller 132, and a WiFi controller 134. The USB and Ethernet controllers 130 and 132 may allow the mater controller 104 to interface with external components via USB and Ethernet ports 131 and 133, respectively. The WiFi controller 134, which includes a wireless transceiver 135, may support communication between authorized users (e.g., a driver or maintenance personnel) and the fleet managing server 30 via the cellular modem 126. The WiFi transceiver 135 may be mounted in a location at the trailer 20 that ensures that communication can be maintained from anywhere within a radius (e.g., 100 feet) of the center of the trailer 20. In some embodiments, the master controller 104 also includes a Bluetooth®/Zigbee® transceiver 127 for communicating with wireless sensor nodes (i.e., those sensors that are not connected to the data bus 112) within the trailer 20. In some examples, an auxiliary wireless transceiver that is independent of the WiFi controller 134 may be mounted to the trailer 20 as part of the STS 100 in order to perform regular self-test of the WiFi system supported by the WiFi controller 134.

In some embodiments, the master controller 104 provides an idle mode, which reduces operating power by suspending operation of all peripherals components (e.g., all sensors and actuators).

In some embodiments, the master controller 104 can enter into sleep mode, which substantially reduces or minimizes operating power by placing each component of the master controller 104 into its lowest power mode.

The firmware of the master controller 104 may be updated wirelessly through the cellular modem 126 (as an over-the-air update) or the WiFi transceiver 134, and/or may be updated via a wired connection through, for example, the USB controller 130 or the Ethernet controller 132.

In some embodiments, the master controller 104 is coupled to an access terminal (e.g., an external keypad/keyboard) 136, which allows authorized users, such as drivers and maintenance personnel, to gain access to the STS 100. For example, by entering an authentication code the master controller 104 may perform the functions associated with the code, such as unlock the trailer door or put the trailer in lockdown mode. The master controller 104 may include an RS-232 transceiver for interfacing with the access terminal 136. The access terminal 136 may be attached to an outside body of the trailer 20.

The STS 100 includes a global positioning system (GPS) receiver for providing location data that can supplement the data aggregated by the sensor network 101. The GPS receiver may be integrated with the master controller 104 or may be a separate unit.

In some embodiments, each time power is first applied to the master controller 104 (e.g., when the operator turns the ignition key or when the STS 100 is activated) or when an external command (e.g., a diagnostic request) is received from the operator/driver or the fleet managing server 30, the master controller 104 performs a self-check or diagnostic operation in which the master controller 104 first checks the status of each of its components (e.g., the PMU, RS-232 interface, Ethernet controller, etc.) and then checks each element (e.g., sensor 102 or SIB 110) attached to the data bus 112. The master controller 104 then may send an alert command to the fleet monitoring server 30 when any component or element has a faulty status. The alert command may include the status data of all elements attached to the data bus 112. The master controller 104 also communicates with the PMU 128 to determine the source of input power as, for example, tractor power 142 or battery backup 129. Once the self-check operation is concluded, the master controller 104 commences normal operation during which the master controller 104 may periodically or continuously receive sensory data from the sensors 102 and send the corresponding data packages to the fleet monitoring server 30 at a set or predetermined rate. In some examples, the rate of information transmission by the master controller 104 may be variable depending on the power state of the STS 100 (e.g., depending in whether the STS 100 is in idle mode, sleep mode, normal operation mode, etc.).

During the course of its operation, the master controller 104 may receive many different types of commands from the fleet managing server 30. Some examples may include a master controller reset command (e.g., an SDM reset), which initiates a reset of the master controller 104; an STS reset command, which initiates a reset of the entire STS 100, including the master controller 104; a self-test command, which initiates the self-test/diagnostic operation of the master controller 104; an STS update command, which is utilized to initiate an update of the STS 100 that may include firmware updates, STS configuration updates, device library updates, and/or the like; a request data command, which is utilized to request data from the SDM and may include configuration data for the master controller 104 and/or the STS 100, status/alert data, sensor measurement data, location and telematics data, and/or the like; a GPS location command, which is utilized to upload present GPS data from the master controller 104; a send data command, which is utilized to send data to the master controller 104; and a security/lock command, which is utilized to remotely set security features including door lock, air brake lock, and/or the like.

Additionally, the master controller 104 may send a variety of commands to the fleet managing server 30 that may include an STS status command, which is utilized to send STS status (e.g., self-test results, operating mode, etc.) to the fleet managing server 30; an alert/fault command, which is utilized to send alerts to the server 30 (e.g., based on the detection of STS faults and/or trailer events that trigger alert settings); SDM data command, which is used to send the measured data aggregated from the sensor network 101; a configuration alert, which is utilized to notify the fleet managing server 30 when STS configuration is modified; and STS access alert, which is utilized to notify the fleet managing server 30 when a user (e.g., a driver or a maintenance operator) attempts to access the STS 100 via WiFi (i.e., through the WiFi transceiver 134) or the keypad 136.

According to some embodiments, the master controller 104 is capable of setting and dynamically adjusting the data rate from each sensor (e.g., the pace at which measurements are made) independent of other sensors (e.g., may do so through the corresponding SIB 110).

Figure 3:
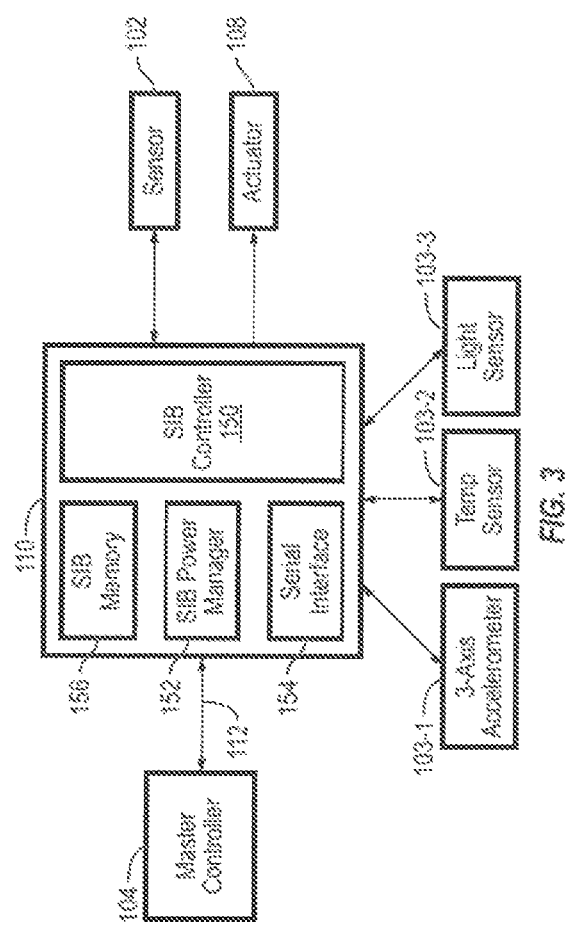
FIG. 3 is a schematic diagram of a SIB facilitating communication between the master controller and a sensor, according to some exemplary embodiments of the present invention.

FIG. 3 is a schematic diagram of a SIB 110 facilitating communication between the master controller 104 and a sensor 102, according to some exemplary embodiments of the present invention.

Referring to FIG. 3, each sensor interface board (SIB) 110 manages an assigned set of one or more sensors 102. Some nodes may also manage one or more actuators 108. Each sensor 102 may translate a physical property, such as heat, mechanical motion, force, light, and/or the like, into a corresponding electrical signal. Each actuator 108 is configured to produce an associated mechanical motion when activated (e.g., when an activation voltage is applied to it), and to return to its idle/original position when deactivated (e.g., when the activation voltage is removed).

According to some embodiments, the SIB 110 includes a SIB controller 150 (e.g., a programmable logic unit), a SIB power manager 152, a serial interface 154, and onboard SIB memory 156. The SIB controller 150 is configured to manage the operations of the SIB 110 and to facilitate communication between the master controller 104 and any sensors 102 and/or actuators 108. The SIB power manager 152 includes an onboard power conversion which converts the system voltage received from the master controller 104 into the required operating voltages for the SIB circuitry as well as the voltages utilized by sensor(s) 102 and any actuator(s) 108. The SIB power manager 152 includes protection circuitry, which prevents damage to the SIB 110 in the event that an overvoltage occurs on the system voltage, and/or in the event that the system voltage and ground are reversed at the power input connector of the SIB 110. The serial interface 154 facilitates communication with the master controller 104 via the data bus 112 and supports RS-232 serial data communication with any sensors capable of a CAN bus transceiver for communicating with any RS-232 compatible sensors. The SIB memory 156 may be a non-volatile memory that stores sensor aggregated data as well as reference values for all voltages monitored by the SIB 110.

In some examples, the SIB 110 is also coupled to a 3-axis accelerometer 103-1, a temperature sensor 103-2, and a light sensor 103-3. The sensors 103-1 to 103-3 may be integrated with the SIB 110 or may be external to the SIB 110. The sensors 102 may include, for example, a wheel speed sensor, one or more tire pressure sensors (TPSs), one or more wheel-end and wheel bearing temperature sensors, a smoke detector, a humidity sensor, one or more vibration detectors, an odometer/speedometer, one or more axle hub sensors, one or more brake wear sensors, a position sensor (e.g., a magnetic position sensor), a digital microphone, and/or the like. In some examples, the odometer/speedometer may go on every tire, or may be on a dedicated tire from which this information is taken; and a brake stroke sensor and brake/wheel-end temperature sensors may be on each brake pad/wheel end. Door open detection may be facilitated by a position sensor (e.g., a magnetic position sensor) and/or the like.

According to some embodiments, the SIB 110 (e.g., the SIB controller 150) may be configured to (e.g., programmed to) be compatible with the specifications of the sensor 102 and to operatively integrate with the sensor 102. As such, the SIB 110 translates and packages the sensed data of the sensor 102 in a format that is compatible with the communication protocol of the shared bus and that is also uniform across all sensors 102 (e.g., is compatible with the Modbus serial communication protocol, or any other suitable protocol).

According to some embodiments, the SIB 110 may provide an idle mode that reduces operating power by suspending operation of all peripherals (e.g., all sensors 102/103 and actuators 108). Additionally, the SIB 110 provides a sleep mode which reduces operating power to the minimum achievable level by placing each circuit on the SIB 110 and all peripherals into their lowest power mode. Idle and sleep mode may be activated and deactivated through a command from the master controller 104.

The SIB 110 may prompt the sensors 102/103 to make measurements at a predetermined pace, which is configurable through the master controller 104. Measured data is then stored at the SIB memory 156 for transmission to the master controller 104. In some embodiments, the SIB 110 may enter idle mode in between measurements.

Every time power is applied to the SIB 110, the SIB 110 may perform a self-check or diagnostic routine to determine the status of each of its components (e.g., the SIB controller 150, the SIB memory 156, the serial interface 154, and the sensors 103-1 to 103-3), and report the status of each component to the master controller 104 (e.g., as pass or fail). The master controller 104 may also initiate a self-check routine at any given time via a diagnostic request command. Upon receiving a failed status of any component, the master controller 104 may issue a command to reset the SIB 110, which may prompt a further self-check routine by the SIB 110.

According to some embodiments, the master controller 104 together with the SIB 110 provide a plug-and-play sensory and telemetry system allowing for sensors and/or actuators to be removed from or added to the STS 100 as desired, thus providing an easily (re)configurable system.

According to some embodiments, the shared data bus 112 may include a plurality of conductors for carrying power and data. In some embodiments, a sensory node including a SIB 110 and one or more sensors 102 may branch off of the communication bus 112 using a T-connector or junction box 113, which facilitates the connection of the sensory node to the shared communication bus 112 via a bus extension 115. The bus extension 115 may include the same conductors as the shared communication bus 112, and the T-connector 113 may electrically connect together corresponding conductors of the shared communication bus 112 and the bus extension 115. By connecting any desired sensor 102 to an existing system via a separate T-connector 113 and bus extension 115, the STS 100 may be easily expanded as desired, without requiring a redesign of the entire system.

In some embodiments, the SIB 110 may be encapsulated in a housing that is molded over (e.g., thermally molded over) the SIB 110 and part of the data bus extension and the wire that electrically couples the SIB 110 to the sensor 102. Extending the molding over the wire and the bus extension may aid in protecting the SIB 110 against environmental elements (e.g., may aid in making it waterproof). The housing may include polyurethane, epoxy, and/or any other suitable flexible material (e.g., plastic) or non-flexible material. The housing may provide thermal protection to the SIB 110 and, for example, allow it to operate in environments having temperatures ranging from about −50 to about +100 degrees Celsius.

Figure 4:
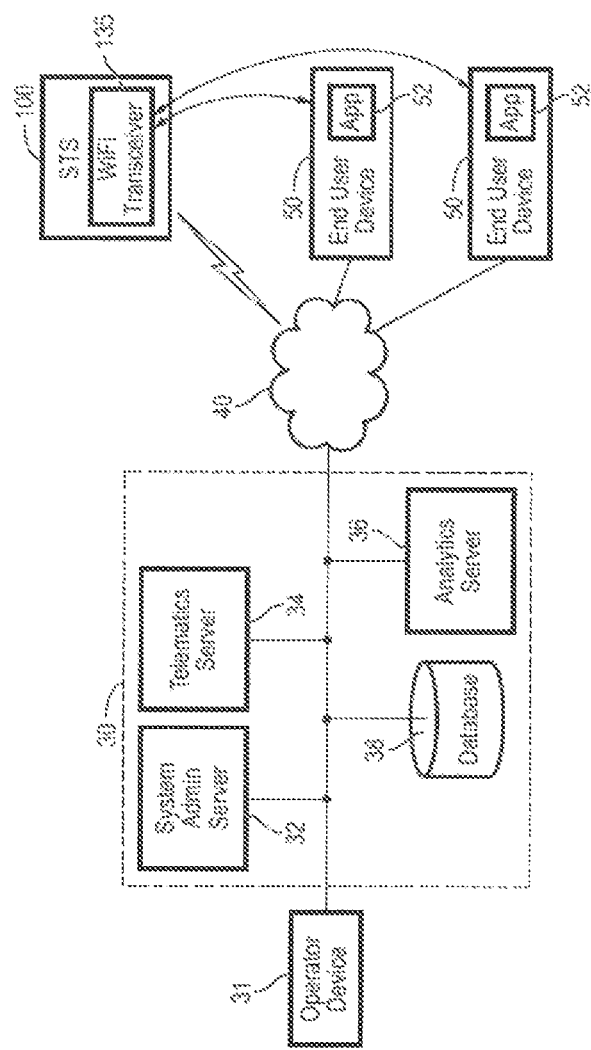
FIG. 4 is diagram illustrating the fleet managing server in communication with the STS and one or more end user devices, according to some embodiments of the present invention.

FIG. 4 is a diagram illustrating the fleet managing server 30 in communication with the STS 100 and one or more end user devices, according to some embodiments of the present invention.

Referring to FIG. 4, the fleet managing server 30 may be in communication with the STS 100 and one or more end user devices 50. Communications between the fleet managing server 30, the STS 100, and an end user device 50 may traverse a telephone, cellular, and/or data communications network 40. For example, the communications network 40 may include a private or public switched telephone network (PSTN), local area network (LAN), private wide area network (WAN), and/or public wide area network such as, for example, the Internet. The communications network 40 may also include a wireless carrier network including a code division multiple access (CDMA) network, global system for mobile communications (GSM) network, or any wireless network/technology conventional in the art, including but not limited to 3G, 4G, LTE, and the like. In some examples, the user device 50 may be communicatively connected to the STS 100 through the communications network 40 (e.g., when the user device 50 has its own 4G/LTE connection). In some examples, the user device 50 may communicate with the STS 100 and the fleet managing server 30 through the WiFi network created by the wireless transceiver 134 of the STS 100, when within WiFi range.

The fleet managing server 30 aggregates a variety of telematics and diagnostics information relating to each specific trailer in the fleet and allows for the display of such information on an end user device 50 or an operator device 31 through a web portal. The web portal of the fleet managing server 30 may allow the operator to administer the system by designating authorized personnel who may access and use the STS 100, as well as drivers and maintenance personnel who are authorized to move and/or maintain the trailers in the fleet.

According to some embodiments, the fleet managing server 30 provides, through its web portal, a comprehensive fleet management system by integrating system administration tools, telematics information, and trailer status information. This combination of information is integrated into an intuitive user interface that allows the operator to effectively manage the fleet. The web portal may provide a set of screens/displays that allow the operator to easily view summary information relating to the fleet of assets being managed. The web portal may also provide a set of screens/displays which allow the operator to view lower levels of detail related to various elements of the fleet. Such information may be presented in a pop-up, overlay, new screen, etc.

According to some embodiments, the fleet managing server 30 includes a system administration server 32, a telematics server 34, an analytics server 36, and a database 38.

The system administration server 32 may provide system administration tools that allow operators to manage access to the fleet system and set the configurations of the fleet system. Access management allows the operator to create and maintain a database of users who are authorized to access and exercise assigned functions of the system. For example, an individual may be designated as the administrator and have access to all aspects of the web portal, and another individual may be designated as a driver or a maintenance technician and be granted a more restricted and limited access to the features of the web portal. Configuration management allows the operator to set the operating parameters of each asset in the system, either on an individual asset basis or as global settings. According to some embodiments, the system administration server 32 allows an authorized system administrator to select the set of alerts and trailer data that the master controller 104 is allowed to transmit directly to an authorized user, such as the driver or maintenance personnel, via the WiFi transceiver 135; to select the set of controls and features which an authorized user may access locally via the mobile application 52; to select the set of controls and features which the master controller 104 may perform autonomously when the cellular modem 126 does not have a connection to the fleet managing server 30; to set an acceptable geographic boundary for the location of the trailer 20 (also referred to as geo-fencing); and/or the like.

The telematics server 34 may provide location-related information relative to each asset (e.g., each STS 100) in the fleet. The telematics information includes geographic location, speed, route history, and other similar types of information which allow the fleet manager to understand the geographic history of a given asset.

The analytics server 36 may provide trailer status information related to data collected from sensors and systems located on the STS 100 of the trailer itself. This information may provide a dynamic image of the critical systems on a given trailer, such as tire pressure, brakes, cargo temperature, door/lock status, etc. In some examples, the analytics server 36 may analyze sensory and telematics data received from each STS 100 of a fleet and provide a variety of information to the fleet operator, including an organized list of alerts based on severity and category for each STS 100 or the entire fleet; a percentage of the fleet that is in use; a percentage of the fleet that is scheduled for, or is in, maintenance; historical maintenance statistics; a visual map of the locations of each trailer in the fleet; the configuration and status of each trailer; the speed and/or destination of each trailer; and information on each of the drivers, technicians, operators, and the like. Driver information may include the driver's identification number, most current assignment, a list of all events of excessive speed, a list of all events of excessive G-force due to braking or high-speed turning, a list of all excessive ABS events, and the like. Trailer status and configuration may include information such as odometer reading, a list of all components installed on a trailer and the status thereof, pressure of each tire, brake status, ABS fault, light out (faulty light) status, axle sensory information, preventive maintenance summary, present speed and location, self-test/diagnostic parameters, pace of sensor measurements, available memory capacity, date of last firmware update, history of data communications, battery capacity, all parameters related to power management (e.g., voltages, currents, power alerts, etc.), and/or the like.

The data generated by and consumed by each of the servers 32, 34, and 36 may be respectively stored in and retrieved from the database 38.

The fleet managing server 30 may also allow control over various aspects of an STS 100. For example, upon invocation by an operator, the fleet managing server 30 may send a command signal to the STS 100 to initiate a self-test by the master controller 104, initiate capture and transmission of all sensor data, activation or release of door locks, activation or release of the air lock, and/or the like.

The analytics server 36 may also issue a number of alerts, based on the analyzed data, which may be pushed to the operator device 31. For example, such alerts may include a break-in alert, when the proximity detector mounted on the door indicates a door-open status; unauthorized tractor alert, when the STS 100 detects airline and/or 7-way connector connections and a proper authorization code is not received via WiFi transceiver 135 and/or the local keypad 136; stolen trailer alert, when the air lock is engaged and the sensors detect trailer motion; brake tamper alert, when the air lock is bypassed or the cable to the air lock from the master controller 104 is cut; tire pressure alert, when a tire pressure is outside of the specified range; brake lining alert, when the brake sensor indicates that a brake lining is outside of the specified range; hub fault alert, when the hub sensor indicates that hub conditions are outside of the specified range; SIB fault self-test alert, when a self-test is run on a SIB 110 and the results indicate a fault; sensor fault alert, when a self-test is run on a sensor and the results indicate a fault; data bus fault self-test alert, when a self-test is run on the sensor data and the results indicate a data bus fault; master controller fault self-test alert, when a self-test is run on the master controller 104 and the results indicate a fault; WiFi fault alert, when a self-test of the WiFi controller is run and the results indicate a fault (if the optional auxiliary WiFi transceiver is installed); excessive speed alert, when the vehicle speed is above the legal speed limit by a predetermined percentage; hazardous driving alert, when the G-force of the trailer is above a specified level (e.g., from cornering too fast, stopping too fast, accelerating too fast, etc.); and/or the like. In some examples, the alerts may include information suggesting the root cause of any detected failures.

According to some embodiments, the mobile application 52 on the end user device 50 allows the user to enter an authentication code to log in to the STS 100 system (e.g., upon verification by, and permission from, the system administration server 32).

Configuration of the mobile app 52 on a given device 50 may be based upon the authenticated user's access level (e.g., a truck driver may have access to one set of features, while an installation/maintenance person may have access to a different set of features). The mobile app 52 may be capable of providing access to historical data stored in the STS local memory 12, allowing authorized users to run a scan of all elements in the STS 100 and to run diagnostics on the STS 100 (i.e., run a self-check diagnostic routine), displaying an alert (visual and auditory) when an alert is received from the STS 100 (the alert may be routed through the analytics server 36 or be directly received from the STS 100).

Figure 5:
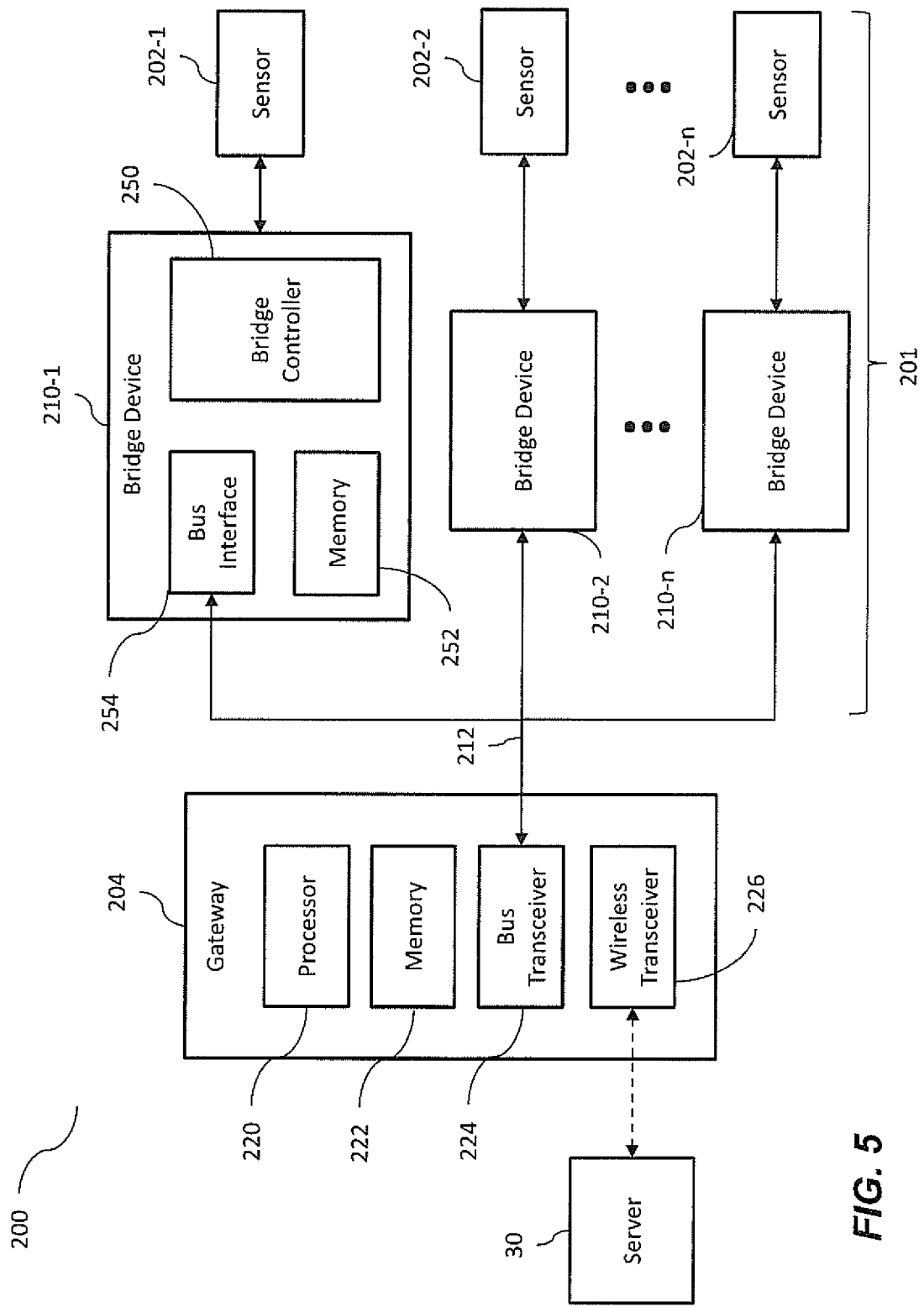
FIG. 5 illustrates a network system according to some exemplary embodiments of the present invention.

FIG. 5 illustrates a network system 200 according to some embodiments of the present invention.

Referring to FIG. 5, a network system 200 includes a plurality of sensors 202-1 to 202-*n* (where n is an integer greater than 1) communicatively connected to a gateway 204 via a data bus 212 (also referred to as a system bus or common bus), and a plurality of bridge devices 210-1 to 210*n* electrically coupled between the data bus 212 and plurality of sensors 202-1 to 202-*n*. Thus, each bridge device 210 may act as an intermediary between the sensor 202 and the gateway 204. As there may be a one-to-one correspondence between the sensors 202 and the associated bridge devices 210, the combination of a sensor 202 and its associated bridge device 210 (e.g., the bridge device that the sensor 202 is directly connected to without any intervening data bus or other bridge device) may be referred to as a sensor node.

The sensors 202-1 to 202-*n* and the data bus 212 may each be the same or substantially the same as the sensor 102 and the data bus 112, respectively. The gateway 204 may facilitate communication between the sensors 202-1 to 202*n*, which collect data (e.g., sensory and proprietary data), and a remote server 30, which collects and analyzes the data. In some examples, the gateway 204 may be the same or substantially the same as the master controller 104 described above with reference to FIGS. 1-4. Thus, the gateway 204 may include all of the components and functionality of the master controller 104; however, embodiments of the present invention are not limited thereto. For example, the gateway 204 may not include all of the components of the master controller 104. In some embodiments, the gateway 204 includes a processor 220, a gateway memory 222, a bus transceiver 224, which may be the same as or substantially the same as the CPU 120, the memory 122, and the bus transceiver 124 of the master controller 104. The gateway 204 further includes a wireless transceiver 226 that enables wireless communication with the remote server 30. The wireless transceiver 226 may include the cellular modem 126 and/or the wife controller 134 of the master controller 104.

The bridge device 210 may act as an intermediary device that facilitates communication between the sensor 202 to which it is attached and the gateway 204. In some examples, the bridge device 210 may be the same or substantially the same as the SIB 110 described above with reference to FIGS. 1-4. Thus, the bridge device 210 may include all of the components and functionality of the SIB 110; however, embodiments of the present invention are not limited thereto. For example, the bridge device 210 may not include all of the components of the SIB 110. In some embodiments, the bridge device 210 includes a bridge controller 250, a bridge memory 252, and a bus interface 254. The bridge controller 250 and the bus interface 254 may be the same as or substantially the same as the SIB controller 150 and the serial interface 154 of the SIB 110. The bridge memory 252 may store data collected by the sensor 202.

The sensors 102 may collect several types of data including sensed data and proprietary data. Sensed data may include a measurement of an external physical property/parameter, such as temperature, speed, acceleration, voltage, electrical current, etc. Proprietary data (also referred to as "raw data") may include information pertaining to internal operations of the sensor 102, such as diagnostic and troubleshooting data that a manufacturer of the sensor 102 may be able to use to debug and/or improve the sensor 102. Proprietary information may be collected far less frequently than sensed data. For example, while a sensor may collect sensed data at a rate of about 100 k/s, proprietary information may be collected about once every 5 to 10 seconds. The sensor 102 may tag internal operational information as proprietary since, in some instances, a competing sensor manufacturer may be able to reverse engineer a product by eavesdropping on this information as it is being transmitted over the data bus 112.

In some embodiments, each bridge device 210 blocks or allows data traffic to pass to the associated sensor 102 based on the sensitivity of the data. According to some embodiments, when a sensor 102-*i* (where i is an integer between 1 and n) is transmitting proprietary data on the data bus 212 via a dedicated pipeline to the gateway 204, the other bridge devices 210 (i.e., those that do not correspond to the sensor 102-*i*) block the other sensors 102 (i.e., all sensors except 102-*i*) on the network from being able to eavesdrop on the proprietary data being transmitted. In some examples, a bridge device 210 may act as a pass-through device except when proprietary data is being broadcast on the data bus 112.

When an active connection between the gateway 204 and the remote server 30 is present, the gateway 204 may broadcast a signal (e.g., a dedicated pipeline open signal) on the data bus 212 to indicate, to all bridge devices 210 and sensors 202, the possibility of establishing a dedicated pipeline for the purpose of transmitting sensitive proprietary information. The gateway 204 established the dedicated pipeline when a sensor 202 indicates that it has some proprietary data to transmit. While the dedicated pipeline is open (or established), no other sensor 202 may transmit data to, or receive data from, the data bus 212, as the data bus 212 is being used to transfer proprietary information. Once the dedicated pipeline is closed, all sensors 102 can resume the transfer of non-proprietary data (e.g., sensed data) via the data bus 212. In the network system 200, the ratio of time devoted to transmitting proprietary data through the dedicated pipeline over time devoted to transmitting other data (e.g., non-proprietary sensor data) may be preset or may be adjustable based on priorities of the system. For example, if the network system is a critical control system, the majority of data transmitted may be proprietary.

Figure 6A:
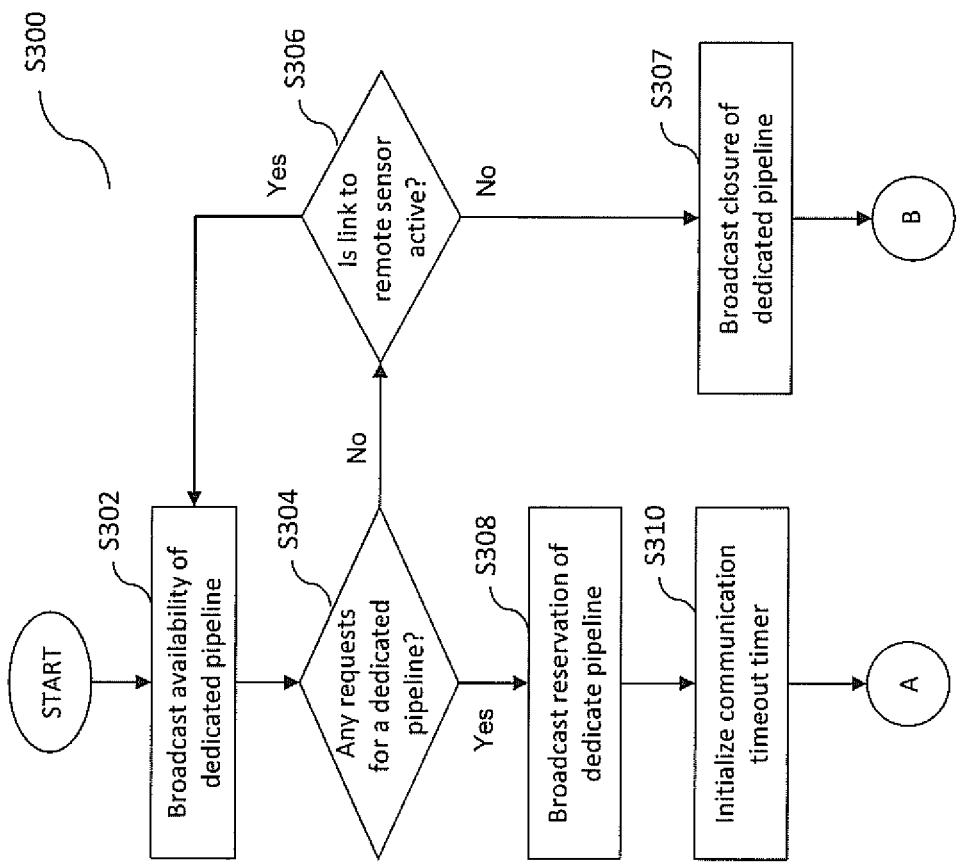
Figure 6B:
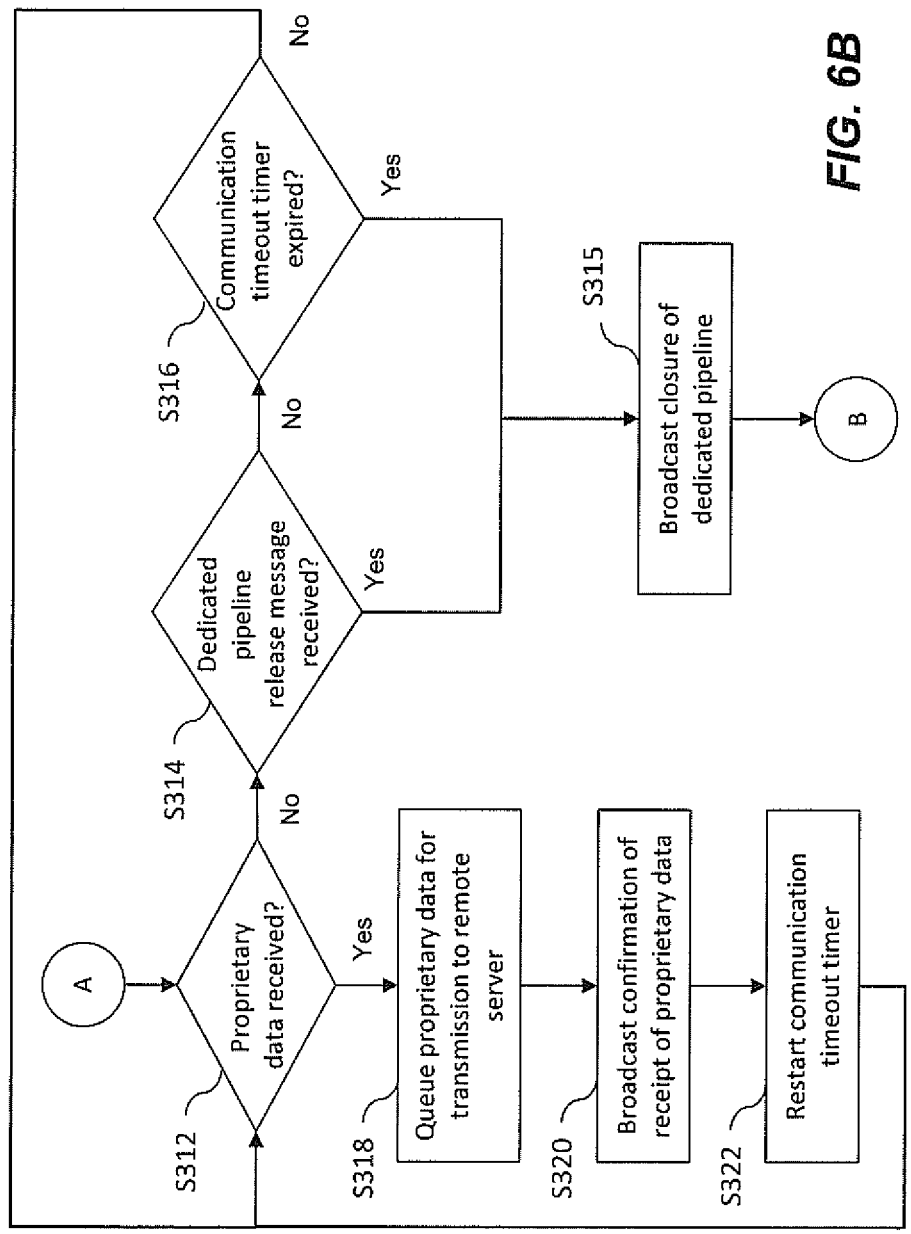

FIGS. 6A-6C illustrate a process S300 of sending proprietary data from a sensor 202 to the server 30 via a dedicated pipeline, as performed by the gateway 204, according to some embodiments of the present invention. FIGS. 6A-6B illustrate the process of receiving and queueing proprietary data from a bridge device 210 corresponding to the sensor 202, and FIG. 3C illustrates the process of transmitting the queued data to the server 30.

Referring to FIGS. 6A-6B, in some embodiments, the gateway 204 indicates, to all of the bridge devices 210-1 to 210-*n* on the data bus 212, the availability of a dedicated pipeline to upload any proprietary data to the remote server (e.g., a cloud server) 30 (S302) by, for example, broadcasting a dedicated pipeline open signal on the data bus 212. In some embodiments, the gateway 204 may do so after determining that there is an active connection (e.g., an upload link) to the remote server 30.

The gateway 204 then waits to receive a dedicated pipeline request from a bridge device 210 (S304), which indicates that the bridge device 210 is requesting to initiate a dedicated (e.g., private) link to the server 30 for purpose of sending proprietary data. If, after a passage of a set period of time (e.g., a configurable period of time, which may, in some examples, be about 0.5 seconds to about 5 seconds), a dedicated pipeline request signal is not received, the gateway 204 checks whether an active link/connection (e.g., an active wifi and/or cellular connection) exists between gateway 204 and the server 30 (S306). If an active link is present, the gateway 204 once again checks for the presence of the dedicated pipeline request signal. But if an active link is not present, the gateway 204 proceeds to broadcast closure of the dedicated pipeline (S307) by, for example, broadcasting a dedicated pipeline closed signal on the data bus 212.

Once the gateway 204 detects a dedicated pipeline request signal from a bridge device 210 having a first address (e.g., a first bus address), the gateway transmits a dedicated pipeline reserved signal on the data bus 212, which confirms that the dedicated link has been established between the server 30 and the bridge device 210 (S308). The dedicated pipeline reserved signal includes a destination address that matches that of the first address of the bridging device 210 requesting the dedicated link. The dedicated pipeline reserved signal also indicates to all other bridge devices 210, which do not match the destination address, that a dedicated link to the server 30 is not available at this time.

In the event that two or more sensors 202 have proprietary data to send in response to a dedicated pipeline becoming available, arbitration may occur between the two or more sensors and one sensor will win according to the protocol of the data bus 212 (e.g., CANBUS or the like). The gateway 204 then establishes the dedicated pipeline with the winning sensor 202. In some examples, the winning sensor is the sensor that responds first to the call for establishing a dedicated pipeline or may be the sensor with the higher priority (e.g., as defined by the bus protocol).

The gateway 204 then initiates and starts the communication timeout timer (S310), and waits to receive proprietary data from the bridge device 210 (e.g., the winning bridge device associated with the winning sensor). The proprietary data may include proprietary/raw sensor data, which is to be sent via the dedicated link to the server 30. The gateway 204 determines whether proprietary data has been received from the bridge device 210 or not (S312). If not, the gateway 204 checks whether the bridge device 210 has released the dedicated pipeline by, for example, checking whether a dedicated pipeline release signal has been received from the bridge device 210 (S314). In some embodiments, when all proprietary data stored at the bridge device 210 has been transmitted to the gateway 204, the bridge device 210 indicates completion of transfer by transmitting the dedicated pipeline release signal to the gateway 204. If a dedicated pipeline release signal has been received, the gateway 204 proceeds to broadcast closure of the dedicated pipeline (S315) by, for example, broadcasting a dedicated pipeline closed signal on the data bus 212. If a dedicated pipeline release signal has not been received and the timeout timer has not expired (S316), the gateway 204 continues to listen for proprietary data (S312). Otherwise, the gateway 204 proceed to broadcast closure of the dedicated pipeline (S315) by, for example, broadcasting a dedicated pipeline closed signal on the data bus 212. Here, the timeout timer ensures that even if the bridging device 210 experiences a failure, and hence fails to send any (further) proprietary data or a dedicated pipeline release signal, the network system 200 does not lockup indefinitely. This allows the gateway 204 to continue performing its functions despite the failure. Once the dedicated pipeline is closed, the gateway 204 may proceed to transfer the queued proprietary data to the remote server 30, which is further described with reference to FIG. 6C below.

When the gateway 204 receives the proprietary data from the bridging device 210 requesting the dedicated link, the gateway 204 queues the proprietary data in the memory 222 and transmits the queued proprietary data to the server 30 at the transmission rate of the active link (e.g., the active wifi and/or cellular connection). Every time proprietary data is received from the bridging device 210, the gateway 204 confirms receipt of the proprietary data by, for example, transmitting a proprietary data received signal on the data bus 212 (S320). The gateway 204 may also restart the communication timeout timer (S322) to ensure that proprietary data transmission from the bridge device 210 is not prematurely terminated due to the timeout timer running out.

Referring to FIG. 6C, when a link to the server 30 is not available, the dedicated link has been released by the bridge device 210, or the timeout timer has expired, the gateway 204 broadcasts a dedicated pipeline closed signal on the data bus to indicate to all bridge devices 210 that a dedicated link to the server 30 is no longer available (e.g., S307/S315). At this point, according to some embodiments, the gateway 204 attempts to upload/transmit any queued data to the server 30 once an active link with the server 30 is established. The dedicated pipeline closed signal also indicates the resumption of normal data transfer operations to all bridge devices 210. That is, sensors 202 may resume transmission of non-proprietary data (e.g., sensor data) to the gateway 204 according to bus protocol (e.g., CANBUS).

The gateway 204 determines whether an active link (e.g., an active wifi and/or cellular connection) exists between gateway 204 and the server 30 (S324). If an active link is not present, the server 30 continues to check for an active link until one is found.

When the gateway 204 determines that an active link is present, the gateway 204 checks whether there is a queue of proprietary data in memory 222 for transmission to the server 30 (S326). In some examples, the queued data may be leftover data from a previous (failed) attempt to send data to the server 30. For example, when there is a failure and the memory 222 contains leftover data that were not successfully sent, after restart, the gateway 204 may attempt to retransmit the data.

If there is no queued proprietary data, the gateway 204 returns to broadcasting a dedicated pipeline open signal on the data bus (S302). However, if queued proprietary data exists, the gateway 204 transmits the queued proprietary data to the server 30 through the active link (S328).

The gateway 204 then checks whether it has received an acknowledgement of transmission indicating successful transmission of data (S330). If the acknowledgment has been received, the gateway 204 deletes the queued proprietary data from memory 222 to clear memory space for further incoming data (S332). Otherwise, if an acknowledgment is not received, the gateway 204 attempts to retransmit the queued proprietary data by checking again whether an active link is present (S324) and retransmitting the queued data if present (S326 and S328).

According to some embodiments, while the bridge device 204-$i$ (where i is an integer between 1 and n) is in communication with the gateway 204 through an established dedicated pipeline, all other bridge devices 210 (i.e., all bridge devices except 204-$i$) on the data bus 212 screen their corresponding sensors 202 (i.e., all sensors except 202-$i$) from any communication between the gateway 204 and the bridge device 204-$i$. For examples, when the signals including the dedicated pipeline request signal, the dedicated pipeline reserved signal, proprietary data signal, the proprietary data received signal, and the dedicated pipeline release signal are transmitted on the data bus 212, all other bridge devices 210 screen their corresponding sensors 202 by, for example, indicating to the sensors 202 that nothing has been transmitted on the data bus 212. In some examples, a bridging device 210 may conceal the transmission of proprietary data on the data bus 212 by sending a screen signal to the corresponding sensor 202. In some examples, the screen signal may be all zeroes, all ones, or any other suitable set of values. In other examples, the bridge device 210 may mask the address of the data traffic by replacing it with the gateway address prior to passing it onto the sensor 202.

In other words, such bridge devices may operate as gatekeepers that segregate all other sensors from the data bus 212 and prevent/block them from receiving proprietary communication of the sensor transmitting the proprietary information.

Figure 7:
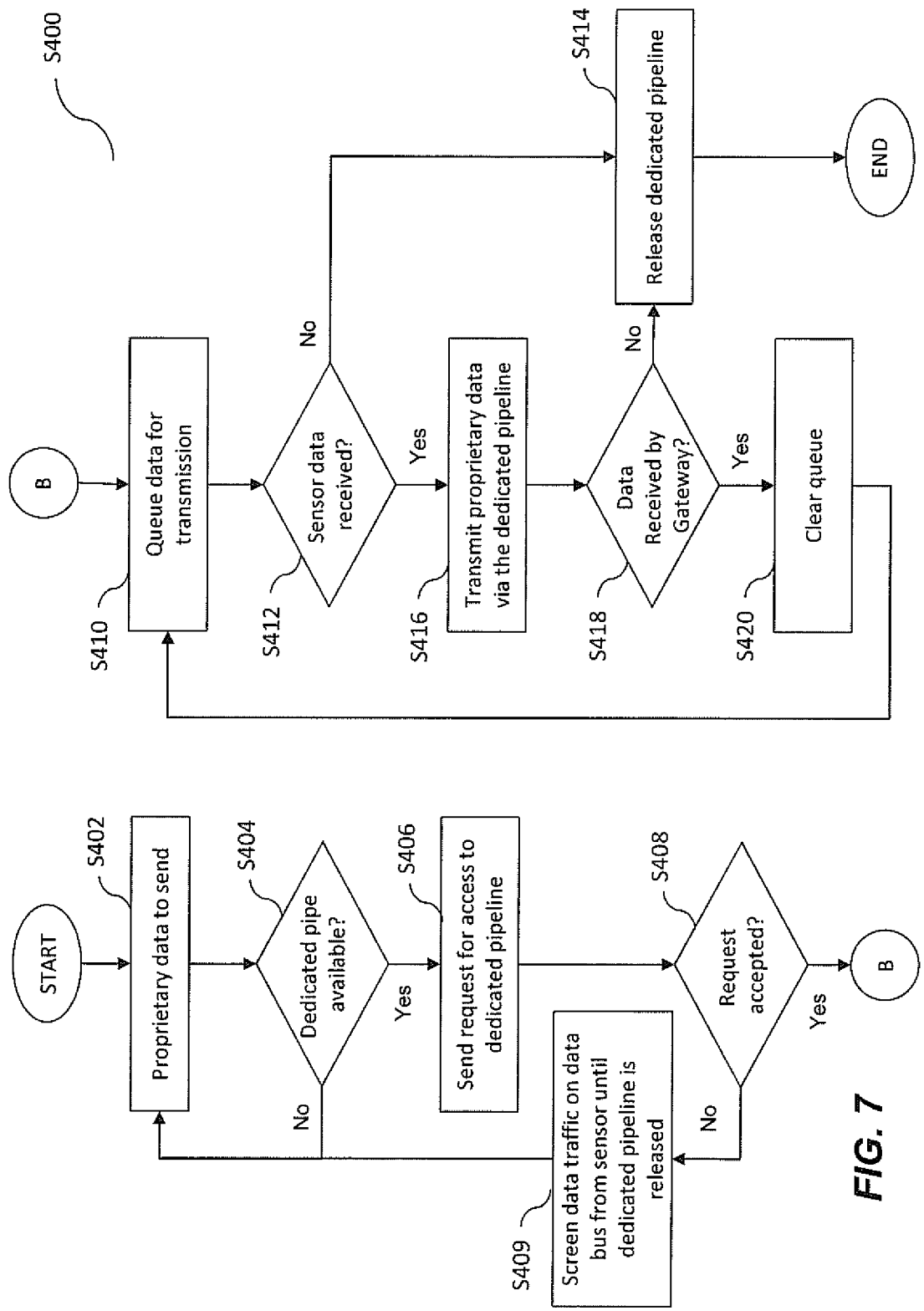
FIG. 7 illustrates a process of sending proprietary data from a sensor to the gateway via a dedicated pipeline, as performed by a bridge device of the network system, according to some exemplary embodiments of the present invention

FIG. 7 illustrates a process S400 of sending proprietary data from a sensor 202 to the gateway 204 via a dedicated pipeline, as performed by the bridge device 210, according to some embodiments of the present invention.

Referring to FIG. 7, in some embodiments, the gateway 204 receives a request to send (e.g., upload) proprietary data to the server 30 (S402). The bridge device 210 then initiates the transfer of proprietary data by first checking whether a dedicated pipeline for transmitting proprietary data is available (S404). In some examples, receipt of the dedicated pipeline open signal on the data bus 212 indicates the availability of the dedicated pipeline. If the dedicated pipeline is available (S408), the bridge device 210 sends a request to the gateway 204 for access to the dedicated pipeline (S406). The request may be the sending of the dedicated pipeline request signal on the data bus 212 by the bridge device 210. Otherwise if the dedicated pipe is not available, the bridge device 210 returns to monitoring for the availability of a dedicated pipeline by, for example, monitoring for a dedicated pipeline open signal from the gateway 204 (S404).

If the request for the dedicated pipeline is not accepted by the gateway 204, this may indicate that the another bridging device has won the arbitration and may be transmitting proprietary data on the data bus. As such, the bridge device 210 screens/conceals all traffic on the data bus 212 from the sensor 202 until it detects that the dedicated pipeline has been released, for example, as a result of receiving a dedicated pipeline release signal from the gateway 204 (S409). Once the dedicated pipeline is released, the bridge device 210 can resume normal operation and, for example, send non-proprietary data (e.g., sensed data) to the gateway 204 via the data bus 212. The bridge device 210 may also return to checking for an available dedicated pipeline (S404). The non-acceptance (i.e., denial) of the request for the dedicated pipeline may be indicated by not receiving a dedicated pipeline reserved signal within a set or predetermined period of time (e.g., about 0.5 seconds to about 5 seconds) or by observing a dedicated pipeline reserved signal on the data bus 212 that is addressed to a different bridge device.

However, if the request for the dedicated pipeline is accepted by the gateway 204 (e.g., if the dedicated pipeline reserved signal is received by the bridge device 210), the bridge device 210 proceeds to initiate queuing of proprietary data from the sensor 202 for transmission to the gateway 204 (S410). At this point, the bridge device 210 determines whether any proprietary data has been received from the sensor 202 or not (S412). If no proprietary data has been received from the sensor 202 within a first period of time (e.g., about 1 second to about 120 seconds), or if the sensor 202 indicates that all proprietary data has already been sent, the bridge device 210 releases the dedicated pipeline (S414) by, for example, transmitting a dedicated pipeline release signal on the data bus 212. Otherwise, if proprietary data has been received from the sensor 202, the bridge device 210 transmits the queued proprietary data to the gateway 204 via the dedicated pipeline (S410) by, for example, sending the proprietary data on the data bus 212. The bridge device 210 then confirms whether the transmission of proprietary data was successful or not (S418). In so doing, the bridge device may determine if a proprietary data received signal was received from the gateway 204 or not. If so, the transmission was successful and the bridge device 210 clears its internal queue for proprietary data (S420) and returns to queueing more proprietary data from sensor (S416). Otherwise, if transmission was not successful, that is, if the proprietary data received signal is not received from the gateway 204 within a second period of time (e.g., about 1 second to about 120 seconds), the bridge device 210 releases the dedicated pipeline (S414). In some examples, the period of time for waiting to receive a dedicated pipeline reserved signal, and the first and second periods of time may be configurable by a system administrator.

Accordingly, some embodiments of the present invention allow sensors in a network to collect and send sensitive proprietary information over a private/dedicated link/pipeline to a remote sensors for further analysis. Further, other sensors in the network are prevented from eavesdropping on the communication of sensitive proprietary information over the dedicated pipeline.

The present invention is not to be limited in scope by the specific embodiments described herein. Indeed, other various embodiments of and modifications to the present invention, in addition to those described herein, may be apparent to those of ordinary skill in the art from the foregoing description and accompanying drawings. Thus, such other embodiments and modifications are intended to fall within the scope of the present invention. Further, although the present invention has been described herein in the context of a particular implementation in a particular environment for a particular purpose, those of ordinary skill in the art may recognize that its usefulness is not limited thereto and that the present invention may be beneficially implemented in any number of environments for any number of purposes. Accordingly, the claims set forth below should be construed in view of the full breadth and spirit of the present invention as described herein and equivalents thereof.

The smart trailer and/or any other relevant devices or components according to embodiments of the present invention described herein may be implemented utilizing any suitable hardware, firmware (e.g., an application-specific integrated circuit), software, or a suitable combination of software, firmware, and hardware. For example, the various components of the smart trailer may be formed on one integrated circuit (IC) chip or on separate IC chips. Further, the various components of the smart trailer may be implemented on a flexible printed circuit film, a tape carrier package (TCP), a printed circuit board (PCB), or formed on a same substrate. Further, the various components of the smart trailer may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

What is claimed is:

1. A method for traffic management of proprietary data in a network system comprising a gateway and a sensor communicatively coupled to the gateway via a data bus, the method comprising:
   determining, by a processor of a bridging device, whether a dedicated pipeline for transmission to the gateway is available;
   in response to determining that the dedicated pipeline is available:
   transmitting, by the processor, a request for the dedicated pipeline;
   determining, by the processor, whether the dedicated pipeline has been established between the bridging device and the gateway; and
   in response to determining that the dedicated pipeline has been established with the bridging device:
   requesting and queueing, by the processor, the proprietary data from the sensor;
   transmitting, by the processor, the proprietary data from the sensor to the gateway via the dedicated pipeline; and
   transmitting, by the processor, a dedicated pipeline release signal to the gateway indicating release of dedicated pipeline between the bridging device and the gateway.

2. The method of claim 1, further comprising:
   receiving, by the processor, a request from the sensor to send proprietary data, prior to determining whether the dedicated pipeline is available.

3. The method of claim 1, further comprising:
   in response to determining that the dedicated pipeline is not established with the bridging device:
   screening, by the processor, all communication on the data bus from the sensor.

4. The method of claim 3, wherein screening all communication on the data bus comprises:
   masking, by the processor, addresses of incoming data traffic prior to forwarding the data traffic to the sensor, or sending, by the processor, a signal of all zeroes to the sensor instead of the incoming data traffic.

5. The method of claim 3, further comprising:
in response to determining that the dedicated pipeline is not established with the bridging device:
determining, by the processor, whether the dedicated pipeline has been released;
discontinuing, by the processor, the screening of all communication on the data bus from the sensor; and
resuming, by the processor, normal transmission of non-proprietary data to the gateway.

6. The method of claim 1, wherein determining that the dedicated pipeline is available comprises:
receiving, by the processor, a dedicated pipeline open signal from the gateway via the data bus.

7. The method of claim 1, wherein the transmitting of the proprietary data comprises:
requesting, by the processor, the proprietary data from the sensor;
receiving, by the processor, the proprietary data from the sensor;
queueing, by the processor, the proprietary data in a queue;
transmitting, by the processor, the queued proprietary data to the gateway via the dedicated pipeline; and
receiving, by the processor, a proprietary data received signal from the gateway indicating receipt of transmitted data.

8. The method of claim 1, wherein the transmitting of the proprietary data further comprises:
clearing, by the processor, the queue of the queued proprietary data; and
requesting, by the processor, more proprietary data from the sensor.

9. The method of claim 1, wherein the transmitting of the dedicated pipeline release signal is in response to one or more of:
determining, by the processor, that all proprietary data at the sensor has been successfully sent to the gateway;
determining, by the processor, that data has not been received from the sensor within a first period of time, in response to requesting the proprietary data; and
determining, by the processor, that a proprietary data received signal has not been received from the gateway within a second period of time, in response to transmitting the proprietary data.

10. The method of claim 1, wherein the proprietary data comprises diagnostic and/or troubleshooting data corresponding to an internal operational of the sensor.

11. A method for traffic management of proprietary data in a network system comprising a gateway and a sensor node communicatively coupled to the gateway via a data bus, the method comprising:
determining, by a processor of the gateway, whether there is an active connection to a remote server; and
in response to determining that there is the active connection to the remote server:
broadcasting, by the processor, availability of a dedicated pipeline for transmission of proprietary data to the gateway via the data bus;
determining, by the processor, whether a request for the dedicated pipeline is received from the sensor node; and
in response to determining that the request for the dedicated pipeline is received from the sensor node within a set period of time:
broadcasting, by the processor, on the data bus, by the processor, a dedicated pipeline reserved signal indicating establishment of the dedicated pipeline between the gateway and the sensor node;
determining, by the processor, whether the proprietary data has been received from the sensor node; and
in response to determining that the proprietary data has been received:
transmitting, by the processor, a proprietary data received signal to the sensor node indicating confirmation of data receipt.

12. The method of claim 11, further comprising:
in response to determining that the request for the dedicated pipeline is not received from the sensor node within the set period of time:
broadcasting, by the processor, unavailability of the dedicated pipeline to the sensor node via the data bus.

13. The method of claim 11, further comprising:
in response to determining that the proprietary data has been received:
queueing, by the processor, the proprietary data in a queue; and
determining, by the processor, whether further proprietary data has been received from the sensor node.

14. The method of claim 11, further comprising:
in response to determining that the proprietary data signal has not been received:
determining, by the processor, whether a dedicated pipeline has been released by the sensor node; and
in response to determining that the dedicated pipeline has been released by the sensor node:
broadcasting, by the processor, a dedicated pipeline closed signal to the sensor node via the data bus, the dedicated pipeline closed signal indicating to the sensor node that the dedicated pipeline is no longer available.

15. The method of claim 14, further comprising:
in response to determining that the proprietary data signal has not been received:
determining, by the processor, whether a communication timer has expired;
in response to determining that the communication timer has expired:
broadcasting, by the processor, a dedicated pipeline closed signal to the sensor node via the data bus, the dedicated pipeline closed signal indicating to the sensor node that the dedicated pipeline is no longer available; and
in response to determining that the communication timer has not expired:
determining again, by the processor, whether the proprietary data has been received from the sensor node.

16. The method of claim 11, further comprising:
prior to determining whether there is an active connection to the remote server, broadcasting, by the processor, a dedicated pipeline closed signal to the sensor node via the data bus, the dedicated pipeline closed signal indicating resumption of normal data transfer operations.

17. The method of claim 11, wherein, in response to determining that there is no active connection to the remote server:
broadcasting, by the processor, a dedicated pipeline closed signal to the sensor node via the data bus.

18. The method of claim 11, further comprising:
transmitting, by the processor, the proprietary data to the remote server.

19. The method of claim 18, wherein the transmitting of the proprietary data comprises:
- determining, by the processor, whether there is an existing queue of proprietary data to transmit to the remote server; and
- in response to determining that there is an existing queue of proprietary data:
- transmitting, by the processor, the queue of proprietary data to the remote server.

20. The method of claim 19, further comprising, in response to determining that there is an existing queue of proprietary data:
- receiving, by the processor, an acknowledgment of transmission from the remote server; and
- clearing, by the processor, the existing queued data.

* * * * *